Patented Apr. 2, 1940

2,195,974

UNITED STATES PATENT OFFICE 2,195,974

PROCESS OF PRODUCING NEW AMINO-CARBOXYLIC ACIDS

Walter Reppe and Hanns Ufer, Ludwigshafen-on-the-Rhine, Germany, assignors to I. G. Farbenindustrie Aktiengesellschaft, Frankfort-on-the-Main, Germany.

No Drawing. Application July 10, 1937, Serial No. 152,996. In Germany May 19, 1936

3 Claims. (Cl. 260—534)

The present invention relates to new amino-carboxylic acids and a process of producing same.

We have found that amino-carboxylic acids can be obtained in an advantageous and quite general manner, usually in very good yields, by causing acrylic acid or methacrylic acid, and ammonia or organic derivatives of ammonia containing at least one $NH_2$- or NH-group to react with each other at temperatures at which the formation of amides does not occur to any appreciable extent. The acrylic acid or methacrylic acid are advantageously used in the free state, preferably in aqueous solution; they may, however, also be used in the form of salts.

As suitable organic ammonia derivatives there may be mentioned primary or secondary amines including polyamines and heterocyclic nitrogenous compounds which contain NH-groups, as for example primary and secondary alkyl-, alkylol-, cycloalkyl- or cycloalkylol-amines (as for example methyl-, ethyl-, propyl-, butyl-, cyclohexyl-, dodecyl-, stearyl-, oleyl-, monoethanol-, di-ethanol- or cyclohexanol-amines or abietinyl-amines), primary or secondary aromatic or ali-phatic-aromatic amines (as for example aniline, phenylenediamines, benzidine, naphthylamines, aminoanthraquinones, benzylamines and phenyl-ethylamine) and heterocyclic compounds containing at least one NH- or $NH_2$-group, as for example indole and its substitution products, piperidine, carbazole or aminopyridine. Amines the amino groups of which contain two different radicles from the same or two different of the above classes, and also diamines, polyamines and amines containing substituents (as for example halogen atoms, tertiary nitrogen atoms or C-alkyl, alkylol, nitro, hydroxy, alkoxy, carboxyl, sulphonic or acylamine groups) may also be used.

The reaction usually proceeds very smoothly with the adding on of the ammonia or its organic derivatives to the double linkage of the acrylic acid. Depending on the working conditions, there may be added on to a primary amine, one or two molecules of the unsaturated acid, and to ammonia one to three molecules of the unsaturated acid. When, in the case of primary amines, as for example aniline, toluidine or cyclohexyl-amine, it is desired to effect the adding on of only one molecule of acrylic acid to the amino group, it is preferable to use an excess of amine, as for example 2 molecular proportions of amine for each molecular proportion of acid. A complete replacement of the free hydrogen atoms of the amino groups is frequently obtained even by using the theoretical amount of acrylic acid; a slight excess of acid has a favourable action in many cases.

If indole is employed, the reaction sometimes proceeds by the adding on taking place in the 3-position of the indole ring. In some cases where by the addition of acid compounds alone an adding on takes place at the nitrogen atom of the indole ring, a substitution of the 3-position may also be effected by the addition of metal salt catalysts, as for example copper salts. The reaction of acrylic acid itself with indole leads in an advantageous manner to N-indolyl-beta-propionic acid in all cases, i. e. with or without the addition of further acid compounds. When such indoles are used as initial materials as are already substituted in the 3-position and no adding on of the alpha.beta-unsaturated compound is possible in the said position, the adding on takes place on the nitrogen atom of the indoles.

When using compounds which are insoluble or difficultly soluble in water and can only be dispersed badly therein, it is preferable in many cases to work in the presence of organic solvents or suspension agents; for this purpose there may be mentioned for example alcohols, ketones, hydrocarbons, bases or acids, or esters, which do not react with acrylic acid, or mixtures of the said substances.

The reaction is carried out at elevated temperatures which usually lie between about 40° and 150° C.; temperatures of from 70° to 100° C. are usually especially advantageous.

While it is not necessary to add catalysts, yet compounds promoting the reaction may be employed; for example in the reaction between indole and its substitution products with acrylic acid there may be used acid condensing agents such as inorganic mineral acids, especially hydrochloric acid, and also boric acid, phosphoric acid or acid or acid-reacting salts such as primary sodium phosphate, sodium bisulphate, zinc chloride, aluminum chloride, organic acids, such as formic acid, acetic acid, butyric acid or chloracetic acid or, as already mentioned, the unsaturated acids themselves. Salts of the nitrogenous bases serving as initial materials with the said inorganic or organic acids, as for example indole or 2-methyl-indole hydrochlorides, may be used in many cases with advantage. The reaction is preferably carried out at elevated temperature, if desired in the presence of solvents or diluents. The use of pressure is also advantageous in many cases. It is not necessary to add to the reaction mixture an amount of acid-reacting compound equivalent to the initial material, but smaller amounts, as for example from 0.5 to 10 per cent of the equivalent amount, are sufficient to carry out the reaction. When using a free alpha.beta-unsaturated acid as initial material, the addition of an acid condensing agent may be entirely dispensed with because in this case the unsaturated acid is itself active as an acid-reacting compound.

Generally speaking it is advantageous to work in the presence of substances which prevent or suppress the polymerization of unsaturated acids or their salts and substances which favour the desired reaction. As substances which hinder the polymerization of acrylic acid there may be mentioned for example aromatic hydroxy compounds, as for example hydroquinone, or copper salts. By the said compounds there is also frequently effected simultaneously an acceleration of the reaction of the acrylic acid or methacrylic acid with the nitrogenous component. As accelerating substances there may be mentioned for example small amounts of alkali, alkali phenolates, tertiary organic bases, such as pyridine, quinoline and dimethylaniline. The tertiary bases may also frequently be used as solvents or suspension agents.

The substances obtainable according to this invention may be used for example as intermediate products for the preparation of dyestuffs, medicaments assistants for the textile and like industries or tanning agents.

The following examples will further illustrate the nature of this invention but the invention is not restricted to these examples. The parts are by weight.

Example 1

93 parts of aniline and 65 parts of a 56 per cent aqueous solution of acrylic acid which has been stabilized by small amounts of copper acrylate are heated while stirring for about an hour at from 90 to 100° C. while under reflux. After cooling, the reaction mixture is mixed with 100 parts of water and 27 parts of calcined soda. The unchanged aniline is extracted with ether. The beta-anilino-propionic acid ($C_6H_5.NH.CH_2.CH_2.CO_2H$)

formed in a very good yield is obtained from the aqueous solution by precipitation with hydrochloric acid, dissolution in ether and evaporation of the ether in the form of an oil which solidifies to a crystalline mass only with difficulty. It is slightly soluble in water and ligroin, and readily soluble in alcohol, ether, acetone and hot toluene; it may be purified by dissolution in chloroform and precipitation with ligroin. The reaction may also be carried out in the presence of organic solvents, as for example methanol, ethanol or acetone.

A similar procedure is adopted when the acrylic acid is replaced by methacrylic acid.

Example 2

93 parts of aniline and 257 parts of a 56 per cent aqueous solution of acrylic acid stabilized by the addition of copper salt are heated at from 90° to 100° C. for about three hours while stirring. After adding an aqueous solution of 106 parts of soda, small amounts of unchanged aniline are removed with ether. The reaction product formed in a very good yield is obtained in the manner described in Example 1 as an oil which solidifies to a crystalline product on standing; it may be purified by recrystallization from water when it is obtained in the form of colourless crystals. The reaction product, which is comparatively readily soluble in hot water and difficultly soluble in cold toluene, probably has the constitution:

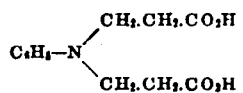

Example 3

107 parts of meta-toluidine and 63 parts of a 56 per cent stabilized solution of acrylic acid are treated in the manner described in Example 1. There is obtained in a very good yield an oil which solidifies to give a crystalline product. It probably has the constitution:

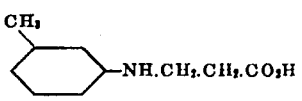

and is scarcely soluble in water and ligroin and readily soluble in dilute alkalies and mineral acids and also in alcohol, acetone, ether, chloroform and toluene.

By using 257 parts of acrylic acid instead of the amount specified above, a dicarboxylic acid is obtained which probably corresponds to the formula:

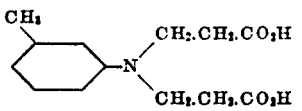

The reaction may be carried out in a similar manner with other substituted amines, as for example xylidines, ortho-, meta-, para-chloranilines, nitranilines, monoacylphenylene-diamines and cresidines.

Example 4

1370 parts of N-monoethanolaniline are heated for 2 hours at from 90° to 100° C. with 535 parts of 66 per cent aqueous acrylic acid. By working up in the manner described in Example 1 there is obtained in a very good yield an oily reaction product having the formula:

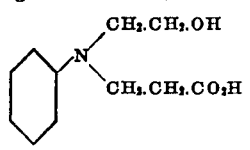

It is scarcely soluble in cold water and in ligroin, slightly soluble in cold toluene and readily soluble in alcohol, ether, dilute alkalies and hot toluene.

Example 5

121 parts of N-monoethylaniline are heated for 2 hours at about 90° C. with 54 parts of a 66 per cent aqueous acrylic acid solution stabilized with copper salt. After adding water and soda and working up in the manner described in Example 1, there is obtained in a very good yield an oily product which probably corresponds to the formula:

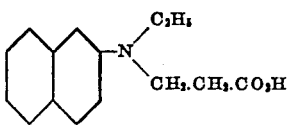

Example 6

63 parts of an aqueous 56 per cent solution of acrylic acid are added at about 80° C. to a solution of 143 parts of beta-naphthylamine in 200 parts of alcohol while stirring, the mixture then being heated to boiling under reflux for a further 2 or 3 hours while stirring. After cooling, the reaction mixture is thoroughly stirred with 27 parts of calcined soda and 150 parts of water, the unchanged beta-naphthylamine extracted with ether and the resulting addition product precipitated from the aqueous solution with hydrochloric acid. Colourless crystals are obtained which are scarcely soluble in water and in ligroin and readily soluble in dilute alkalies, alcohol and acetone. The compound, which is probably beta-naphthylaminopropionic acid having the formula:

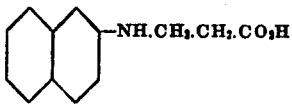

may be readily crystallized from toluene or dilute alcohol.

By heating 143 parts of beta-naphthylamine with 215 parts of 66 per cent aqueous acrylic acid for 4 hours, there is obtained in a very good yield a dicarboxylic acid which probably corresponds to the formula:

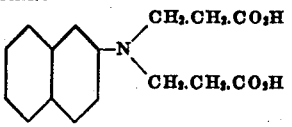

It is much more readily soluble in hot water but much more difficultly soluble in hot toluene than the beta-naphthylaminopropionic acid mentioned above.

The addition compounds of alpha-naphthylamine, aminonaphthols, naphthylamine and aminonaphthol sulphonic or carboxylic acids, and the addition compounds of 1 molecular proportion of acrylic or methacrylic acid and their N-monoalkyl-, -hydroxyalkyl-, -aryl- and -arlkyl-compounds are obtained in a corresponding manner.

Example 7

73 parts of mono-normal-butylamine and 53 parts of a 66 per cent aqueous acrylic acid solution are stirred in a boiling water bath for 1½ hours. After adding an aqueous solution of 27 parts of calcined soda, the whole is evaporated in vacuo. The sodium salt of normal-butylaminopropionic acid is obtained. By dissolution in a little water, acidification with dilute hydrochloric acid until a reaction slightly acid to Congo is obtained, addition of acetone, separation of the sodium chloride deposited and evaporation in vacuo, there is obtained, after again dissolving in acetone, separating the residual sodium chloride and evaporating the solution, the free normal-butylaminopropionic acid having the formula $C_4H_9.NH.CH_2.CH_2.CO_2H$ in the form of an oil which solidifies to a crystalline product on standing for a long time and which is readily soluble in water or alcohol and difficultly soluble in ether, ligroin and toluene.

If, instead of the 53 parts of acrylic acid mentioned above, 215 parts be used, the dicarboxylic acid having the formula:

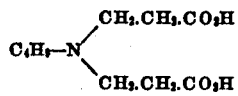

is obtained.

In a corresponding manner the addition compounds of 1 or 2 molecular proportions or acrylic or methacrylic acid and other aliphatic primary amines, such as methylamine, ethylamine, dodecylamine, octadecylamine and octadecenylamine and of 1 molecular proportion of acrylic or methacrylic acid and 1 molecular proportion of a secondary amine, such as dimethylamine, diethylamine, dibutylamine, butylethylamine, and didodecylamine or dioctadecylamine may be prepared.

Example 8

108 parts of ortho-phenylenediamine and 447 parts of a 66 per cent aqueous stabilized acrylic acid solution are heated at about 90° C. for 5 hours while stirring. After cooling, an aqueous solution of 240 parts of sodium carbonate is added and the residue remaining insoluble separated. By adding hydrochloric acid, the reaction product separates as an oil. It separates in a purified form from solutions in hot water.

Example 9

99 parts of cyclohexylamine and 55 parts of a 66 per cent aqueous stabilized acrylic acid solution are heated at from 90° to 100° C. for an hour while stirring. After adding a solution of 30 parts of sodium carbonate, the reaction mixture is evaporated in vacuo and triturated with acetone. The undissolved salt is dissolved in a little water, the solution rendered acid to congo and evaporated in vacuo. A colourless mixture of common salt and the hydrochloride of the resulting addition compound:

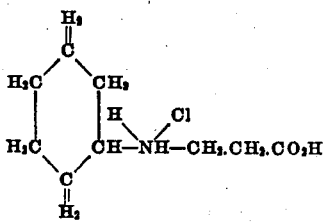

is obtained. The latter is dissolved out with hot alcohol. After evaporating the alcohol there are obtained by trituration with acetone colourless crystals which are readily soluble in water or alcohol and difficultly soluble in acetone.

Example 10

97 parts of piperidine and 110 parts of a 66 per cent aqueous stabilized acrylic acid solution are heated to about 90° C. for 1½ hours. After adding a solution of 60 parts of soda, there is precipitated by the addition of acetone a colourless crystal mass which is separated from the liquid, dissolved in the smallest possible amount of water and treated with concentrated hydrochlorid acid. The hydrochloride of the reaction product is thus precipitated; after filtration it may be purified by recrystallization from alcohol. It is probably:

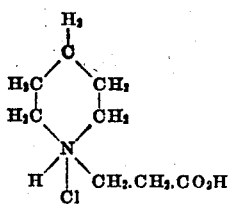

The product is slightly soluble in cold alcohol, acetone and glacial acetic acid and more readily soluble in cold water, hot alcohol and hot glacial acetic acid.

Example 11

190 parts of dodecylamine and 53 parts of a 66 per cent aqueous stabilized acrylic acid are heated at from 90° to 100° C. for 3 hours while stirring. After adding a solution of 30 parts of calcined soda, acetone is added. The precipitate is freed from unchanged dodecylamine with acetone and ether. After drying, a soap-like product is obtained, the sodium salt of beta-dodecylaminopropionic acid which is readily soluble in water.

By using 220 parts of 66 per cent acrylic acid instead of 53 parts, the compound:

$$C_{12}H_{25}N(CH_2.CH_2.CO_2Na)_2$$

is obtained in an analogous manner.

*Example 12*

375 parts of 23 per cent aqueous ammonia and 1090 parts of a 66 per cent aqueous stabilized acrylic acid solution are heated at about 100° for 4 hours in a stirring autoclave. The hot solution is filtered with animal charcoal and cooled; colourless crystals are precipitated which may be purified by recrystallization from water. They are soluble with difficulty in cold water and alcohol and readily soluble in hot water and dilute alkalies. The product is probably $$N(CH_2.CH_2.CO_2H)_3.$$

*Example 13*

A mixture of 355 parts of indole and 400 parts of 70 per cent acrylic acid is shaken in a pressure-tight vessel for 12 hours at from 120° to 130° C. By distilling the reaction mixture there is obtained in practically the quantitative yield indole-N-beta-propionic acid boiling between 180° and 197° C. and having a melting point of 91° C.

*Example 14*

330 parts of 2-methylindole are heated with 300 parts of 70 per cent acrylic acid for 20 hours at from 90° to 100° C. in a stirring vessel under reflux. By distilling the reaction mixture there is obtained in a very good yield 2-methylindole-N-beta-propionic acid which boils between 210° and 230° C. at 2 millimetres pressure (mercury gauge) and which melts at 135° C.

*Example 15*

330 parts of 2-methylindole are shaken in a pressure-tight vessel with a solution of 280 parts of sodium acrylate in 280 parts of water and 20 parts of glacial acetic acid for 15 hours at from 180° to 190° C. After cooling, the slight amount of unchanged 2-methylindole is filtered off by suction and the filtrate is acidified. A good yield of 2-methylindole-N-beta-propionic acid having a melting point of 135° C. is obtained.

*Example 16*

1540 parts of a 51 per cent aqueous stabilized solution of acrylic acid are run to a hot solution of 2760 parts of para-nitraniline in 2000 parts of alcohol while stirring and heating to boiling under reflux. Thereupon the whole is stirred at about 90° C. for another four hours. After cooling, 1260 parts of caustic soda solution of 40° Bé. are added, the alcohol distilled off in vacuo, any residue still left in undissolved state is separated after dilution with water and subsequently washed with a little water. From the filtrate purifier by filtration by means of animal charcoal the reaction product is precipitated by means of hydrochloric acid. The compound obtained having the following formula

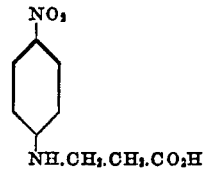

results in the form of yellow crystals which are difficultly soluble in water, more readily in acetone and alcohol, and readily in dilute alkalies.

By four hours' heating 1380 parts of para-nitraniline with 2300 parts of 65.5 per cent aqueous stabilized acrylic acid the di-carboxylic acid is obtained in a very good yield; it forms yellow crystals which when recrystallized from alcohol melt at between 161° and 165° C. The compound probably has the following formula

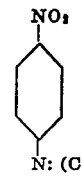

The reaction proceeds in an analogous manner by starting from ortho- or meta-nitraniline, 4-nitro-2-a m i n o-1-methylbenzene, 6-n i t r o-2-amino-1-methylbenzene and similar nitro amines.

*Example 17*

3020 parts of N-ethanol-meta-toluidine are heater at from 90° to 100° C. for from 6 to 8 hours with 2200 parts of a 65.5 per cent aqueous solution of acrylic acid stabilized with copper salt, while stirring. After addition of 2000 parts of water and 2300 parts of caustic soda solution of 40° Bé. the aqueous solution is extracted by means of ether. The aqueous solution is filtered with animal charcoal and acidified by means of hydrochloric acid. The compound thus formed

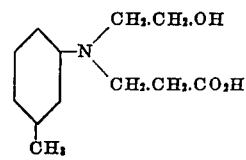

which is readily soluble in alkalies, ether and alcohol, but difficultly in water is obtained by extraction with ether.

*Example 18*

1200 parts of a 60 per cent aqueous stabilized solution of acrylic acid is added at from 90° to 100° C., while stirring, to 1220 parts of mono-ethanolamine, whereupon stirring is continued for another two hours at the same temperature. After the addition of 1000 parts of water and 530 parts of anhydrous soda, the mixture is evaporated to dryness in vacuo. The resulting compound $HO.CH_2.CH_2.NH.CH_2.CH_2.CO_2Na$ is readily soluble in water but difficultly in cold alcohol and acetone.

By four hours' heating of 610 parts of mono-ethanolamine with 2400 parts of a 65.5 per cent aqueous stabilized solution of acrylic acid and precipitation by means of acetone and methanol, the di-sodium salt of the formula $$HO.CH_2.CH_2.N=(CH_2.CH_2.CO_2Na)_2$$

is obtained in the form of colorless crystals.

The addition compounds of acrylic acid to di-ethanolamine and other primary and secondary alkylol amines are obtained in a corresponding manner.

*Example 19*

540 parts of a 82 per cent aqueous solution of methacrylic acid are added at from 90° to 100° C. within three hours, while stirring, to a mixture of 930 parts of aniline, 10 parts of copper sulphate, 5 part of hydroquinone and 1 part of red phosphorus, stirring being continued for three hours at the same temperature. After the addition of 1000 parts of water and 300 parts of soda any oily constituents not having passed into solution are removed by extraction with ether. From the aqueous solution purified by filtration with animal charcoal the resulting compound is precipitated by means of hydrochloric acid, dissolved in ether, the ether solution separated off, and the ether evaporated. The compound formed having probably the following formula

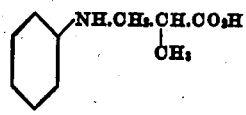

is easily soluble in dilute alkalies, ether and alcohol, but difficultly soluble in water.

*Example 20*

865 parts of metanilic acid are stirred with 1300 parts of a 58 per cent aqueous stabilized acrylic acid solution at between 90° and 100° C. for 7 hours. The compound having the following formula

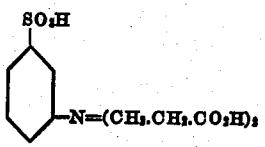

which results in a very good yield, is then dissolved by the addition of hot water. On cooling, it crystallizes out in the form of colorless crystals. It is little soluble in cold but well soluble in hot water.

If instead of metallic acid the same amount of sulphanilic acid be employed, a compound is obtained having the following formula

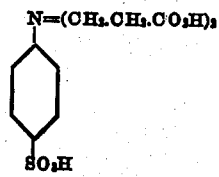

Frequently this compound crystallizes only with difficulty from the reaction mixture and it is therefore preferably first precipitated by the addition of a large amount of acetone in the heat and then recrystallized from water. It forms colorless crystals which decompose above 220° C.; it is difficultly soluble in alcohol and acetone, somewhat more readily in cold water, but readily in hot water and dilute alkalies.

*Example 21*

4400 parts of a 65 per cent aqueous stabilized solution of acrylic acid are slowly added at between 90° and 100° C. to 1200 parts of ethylene diamine, while stirring, stirring being continued for another three hours at the same temperature. After evaporation in vacuo a colorless solid residue is obtained which is purified by recrystallization from water. The resulting compound having probably the following composition

forms colorless crystals which melt at between 180° and 182° C. It is but little soluble in cold water, alcohol and acetone, but readily so in dilute alkalies and hot water.

By running 2200 parts of a 65.5 per cent aqueous stabilized solution of acrylic acid to 2400 parts of ethylene diamine at between 90° and 100° C. while stirring, heating at from 90° to 100° C. for another three hours, evaporating in vacuo, extracting the residue with boiling methanol and evaporating the said solution in methanol, a sirupy mass is obtained which on standing for a prolonged period of time solidifies to form a crystalline mass. It is readily soluble in water, methanol and alcohol, but difficultly in acetone. According to analysis it has the formula

The compound referred to in paragraph 1 is obtained by heating 180 parts of ethylene diamine and 1400 parts of a 66 per cent aqueous solution of acrylic acid at between 90° and 100° C. for 4 hours while stirring and precipitating by means of acetone.

In an analogous manner, the corresponding compounds from other aliphatic amines and polyamines, as for example from polyethylene-polyamines, are obtained.

*Example 22*

1370 parts of ortho-amino-benzoic acid are stirred with 2600 parts of a 58 per cent aqueous stabilized solution of acrylic acid at between 90° and 100° C. for 4 hours. After diluting with an equal amount by volume of hot water and allowing to stand for a prolonged period of time, a compound having the following formula

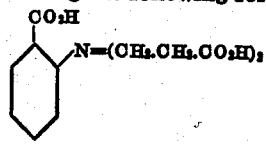

crystallizes out in the form of faintly yellow crystals, which may be readily recrystallized from water.

*Example 23*

765 parts of para-amino-salicyclic acid

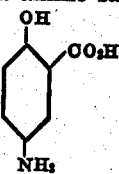

are heated with 1300 parts of a 58 per cent aqueous stabilized solution of acrylic acid on a water bath for 4 hours. Towards the close of this interval the mass turns solid. The resulting compound

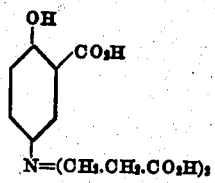

can be purified by recrystallization from a large amount of water or by dissolution in dilute alkalies and precipitation by means of acid. It forms colorless crystals which are difficultly soluble in cold water and alcohol but readily soluble in alkalies.

*Example 24*

1230 parts of ortho-amino-para-cresol

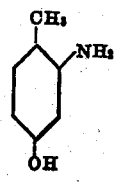

are stirred with 2300 parts of a 65.5 per cent aqueous stabilized solution of acrylic acid at 100° C. for 4 hours. After diluting with water and cooling the crystals separated are filtered off by suction and purified by recrystallization from water or methanol. The compound which results in the form of colorless crystals melting between 150° and 151° C. has the following formula

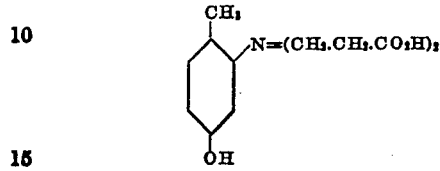

Example 25

2200 parts of a 65.5 per cent stabilized aqueous solution of acrylic acid are added to 4920 parts of para-anisidine at between 90° and 100° C. while stirring, stirring being continued at 100° C. for 4 hours. After the addition of 4000 parts of water and 1100 parts of soda, unchanged para-anisidine is separated after cooling and the aqueous solution evaporated in vacuo. The resulting compound having the following formula

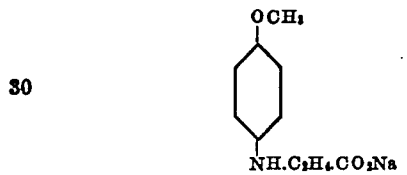

is obtained in the form of colorless water-soluble crystals. It may be freed from small, amounts of unconverted para-anisidine by treatment with boiling acetone.

Example 26

1100 parts of an aqueous stabilized 65.5 per cent solution of acrylic acid is added to 2980 parts of amino-hydroquinone-dimethyl ether at between 90° and 100° C. while stirring, stirring being continued at about 100° C. for three hours. After the addition of 3000 parts of water and 600 parts of anhydrous soda the bulk of the unchanged amino compound separated is filtered off by suction in the cold, the aqueous solution is shaken with ether for the purpose of removing therefrom any amino compound employed which may still be contained therein and purified by filtration with animal charcoal. The resulting compound

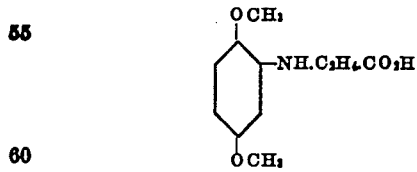

is precipitated by means of hydrochloric acid and purified by recrystallization from methanol. It forms colorless crystals which are difficultly soluble in cold water and cold methanol but readily in hot methanol, alcohol and dilute alkalies.

Example 27

483 parts of N-β-cyanethyl-meta-toluidine

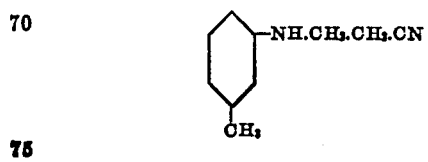

are stirred at about 100° C. for four hours with 325 parts of a stabilized 65.5 per cent aqueous solution of acrylic acid. 1000 parts of water and 180 parts of anhydrous soda are then added to this mixture and any unchanged N-cyanethyl-meta-toluidine is removed from the aqueous solution by extraction with ether. The resulting compound is precipitated from the aqueous solution by means of hydrochloric acid as an oil. After separating the latter, dissolving it in acetone, purifying the acetone solution by filtration with animal charcoal and evaporation in vacuo, the following compound

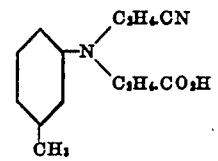

being difficultly soluble in water but readily soluble in alcohol, acetone and dilute alkalies is obtained.

Example 28

223 parts of the compound

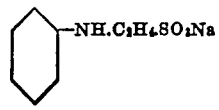

are heated for four hours on the water-bath with 127 parts of a stabilized 65 per cent aqueous solution of acrylic acid. After cooling the compound

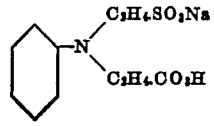

crystallizes out in the form of colorless crystals.

Example 29

1510 parts of the sodium salt of phenylglycine

are stirred for four hours at 100° C. with 1150 parts of a stabilized 65.5 per cent aqueous solution of acrylic acid. After the addition of hot water the mixture is filtered with animal charcoal, and from the filtrate the compound

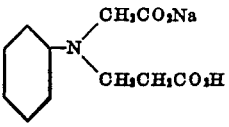

is allowed to crystallize out after the addition of methanol. It is difficultly soluble in alcohol and acetone but readily soluble in water.

Example 30

955 parts of a stabilized 75 per cent aqueous solution of acrylic acid are added while stirring, at between 90° and 100° C., to 1130 parts of 1.2.3.4-tetrahydroquinoline. Thereupon stirring is continued for 2 hours at about 100° C. After dilution with 2000 parts of water the compound

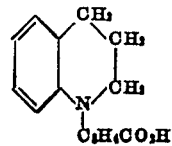

is allowed to crystallize. It is difficultly soluble in water but readily soluble in dilute alkalies, acetone, alcohol and ether.

Example 31

A solution of 215 parts of the hydrochloride of the compound

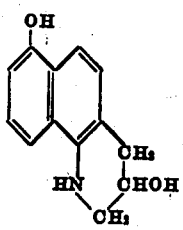

200 parts of water, 114 parts of caustic soda solution of 40° Bé. and 120 parts of a stabilized aqueous 65.5 per cent solution of acrylic acid is stirred at between 90° and 100° C. for 4 hours. After cooling, the aqueous solution is separated from the undissolved constituents and the latter dissolved in 1000 parts of water and 100 parts of sodium bicarbonate. After filtering the resulting solution with animal charcoal, hydrochloric acid is added and the precipitate formed is separated off and dissolved in acetone. The resulting compound probably having the following composition:

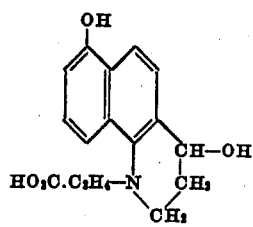

is obtained by evaporating the acetone solution. It is readily soluble in dilute alkalies and methanol, but difficultly in water.

By four hours' heating of 300 parts of the compound

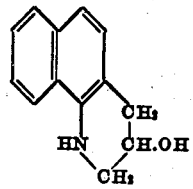

300 parts of alcohol, 5 parts of caustic soda solution of 40° Bé and 280 parts of a stabilized 51 per cent aqueous solution of acrylic acid at between 90° and 100° C., a compound is obtained probably having the following formula:

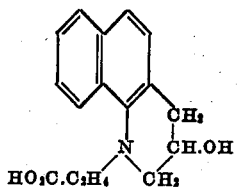

This compound is readily soluble in dilute caustic soda solution and dilute hydrochloric acid, but difficultly soluble in water.

Example 32

540 parts of a stabilized 51.5 per cent aqueous solution of acrylic acid is added at between 90° and 100° C. while stirring to 2160 parts of a mixture of the primary amines which is obtainable by treating the fatty acid mixture contained in the palm kernel oil according to British Patent No. 421,718, whereupon stirring is continued at about 100° C. for four hours. After adding caustic soda solution of 40° Bé. until the mixture has an alkaline reaction towards triacene, there is precipitated by means of acetone. The precipitate is triturated with acetone and boiled until it takes a crystalline consistency. There is obtained a mixture of the compounds R.NH.$C_2H_4$.$CO_2$Na (R being an alkyl radicle corresponding to palm kernel fatty acid) in the form of a soluble product which dissolves readily in water.

In an analogous manner the corresponding compounds of other alkyl amines having a high molecular weight, as for example of N-monooleylamine, are obtained.

By heating about 2 molecular proportions of acrylic acid with 1 molecular proportion of amine, sodium salts of di-carboxylic acid having the following formula: alkyl-N=($C_2H_4$.$CO_2$Na)$_2$ are obtained. Alkali salts of $\beta$-amino-propionic acids and $\beta$-imino-dipropionic acids substituted by higher molecular alkyl radicles have a good power especially in the heat, furthermore a good washing action, a softening action towards artificial silk and a good dispersing power for calcium salts.

Example 33

10 parts of most finely divided 1.4-diaminoanthraquinone are heated with 23 parts of a 75 per cent aqueous solution of acrylic acid for 3 hours under reflux. After cooling, the undissolved parts are dissolved by the addition of an excess amount of aqueous ammonia. Small amounts of undissolved constituents are removed by filtration. The resulting compound is precipitated from the filtrate by means of hydrochloric acid. The compound resulting in the form of blue crystals is difficultly soluble in water, ether and xylene, but rather easily soluble in alcohol. It may be recrystallized from amyl alcohol. The compound having the following formula

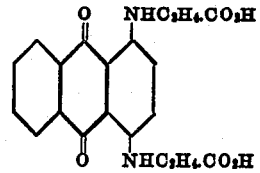

has presumably been formed by the adding-on of two molecules of acrylic acid to one molecule of 1.4-diaminoanthraquinone.

In analogous manner addition compounds having dyestuff character are obtained also from other aminoanthraquinones and acrylic acid; they have a good affinity for acetate artificial silk and wool.

What we claim is:

1. The process for the production of aminocarboxylic acids which comprises causing a substance selected from the class consisting of acrylic acid and methacrylic acid to react with a substance selected from the class consisting of ammonia and organic derivatives of ammonia containing at least one NH$_2$-group and those containing at least one NH-group at a temperature between about 40 and about 150° C. in the presence of water.

2. The process for the production of aminocarboxylic acids which comprises causing a substance selected from the class consisting of acrylic acid and methacrylic acid to react with a substance selected from the class consisting of ammonia and organic derivatives of ammonia containing at least one NH₂-group and those containing at least one NH-group at a temperature between 70° and 100° C. in the presence of water.

3. The process for the production of aminocarboxylic acids which comprises causing a substance selected from the class consisting of acrylic acid and methacrylic acid to react with a substance selected from the class consisting of ammonia and organic derivatives of ammonia containing at least one NH₂-group and those containing at least one NH-group at a temperature between about 40 and about 150° C. in the presence of water and a condensing agent.

WALTER REPPE.
HANNS UFER.